No. 642,643. Patented Feb. 6, 1900.
H. SWANTON.
IMPLEMENT FOR REMOVING PNEUMATIC TIRES.
(Application filed July 16, 1898.)
(No Model.)
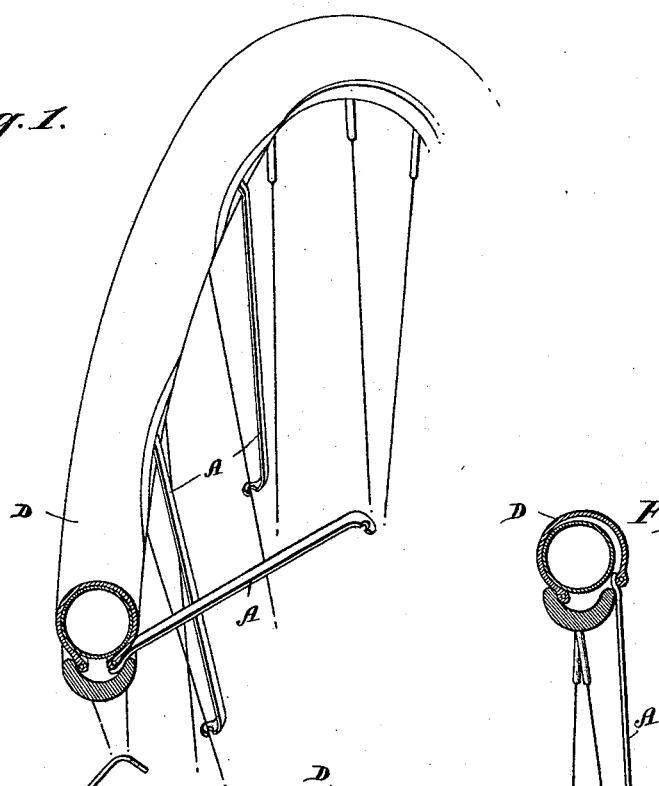
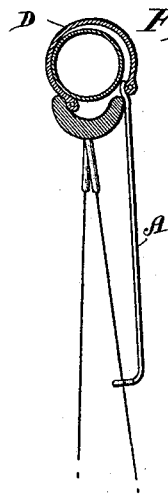
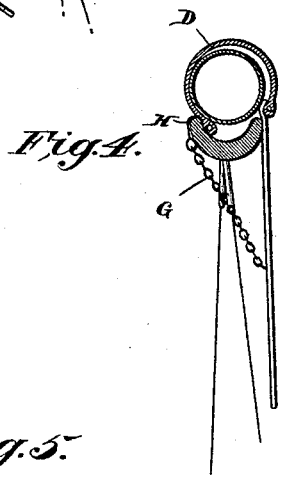
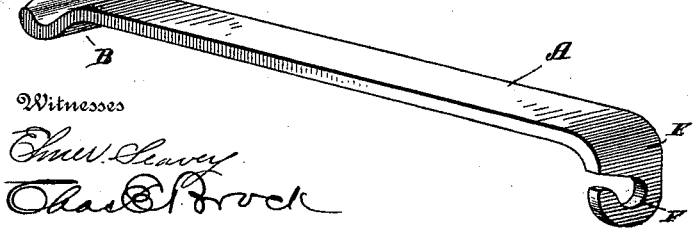
Witnesses
Chas. W. Leavey
Chas. P. Brock
Inventor
Hugh Swanton,
by Demarest
Attorneys
THE NORRIS PETERS CO., PHOTO-LITHO., WASHINGTON, D. C.

UNITED STATES PATENT OFFICE.

HUGH SWANTON, OF LONDON, ENGLAND.

IMPLEMENT FOR REMOVING PNEUMATIC TIRES.

SPECIFICATION forming part of Letters Patent No. 642,643, dated February 6, 1900.

Application filed July 16, 1898. Serial No. 686,190. (No model.)

*To all whom it may concern:*

Be it known that I, HUGH SWANTON, a subject of the Queen of Great Britain, residing at Stepney, London, county of Middlesex, England, have invented a new and useful Implement for Removing Pneumatic Tires, (for which I have obtained British Letters Patent No. 30,564, dated December 28, 1897; Austrian patent, dated May 10, 1898, No. 48/2,666, and Belgian Letters Patent No. 134,386, dated March 15, 1898,) of which the following is a specification.

This invention relates to an improved tool for facilitating the manipulation of pneumatic tires; and the object thereof is to provide a tool whereby the casing of the tire may be quickly and readily removed without injury to the air-tube or rim of the wheel.

With the above object in view the invention consists of a plurality of levers having engaging portions at one end, adapted to be inserted beneath the wired edge of the outer casing at various points about the rim of the wheel and moved to pry said edge from the rim, and means for retaining each of said levers in operative position with a portion of the wired edge forced from the rim while the next lever is inserted and operated, so that the most obstinate tire may be readily removed.

The invention consists in the novel details of construction hereinafter fully described in the specification, particularly pointed out in the claims, and illustrated by the accompanying drawings, in which—

Figure 1 is a perspective view of a portion of a wheel with my invention applied to the tire thereof. Fig. 2 is a cross-section of the tire and rim, showing the first position of the tool. Fig. 3 is a similar view showing a portion of the wired edge forced from the rim and the levers secured to retain the same. Fig. 4 is also a cross-section showing a slightly-modified construction. Fig. 5 is a perspective view of the tool.

Referring now more particularly to the accompanying drawings, A designates a lever having one of its ends bent laterally to form a shoulder B, adapted to rest upon the edge of the rim and formed on its opposite side with a transverse groove C to receive the wired edge of the casing D of the tire. The opposite end of said lever is bent laterally, as at E, and formed with a hook F.

In operation, the tire being deflated, the grooved end of the lever is placed beneath the wired edge of the casing opposite one of the spokes and is used as a lever, the rim of the wheel forming a fulcrum, until the hooked end engages the spoke of the wheel, thereby retaining a portion of the wired edge of the casing above the rim of the wheel. A second and third lever may be similarly applied opposite adjacent spokes. A large portion of the wired casing is thus secured above the rim of the wheel, but not sufficient to free an obstinate tire. The center lever may then be removed, if it has not disengaged itself, and be applied as a fourth lever, and so on until the most obstinate tire is removed entirely unaided and with great facility even in the hands of a child, this step-by-step method of detachment overcoming the difficulties heretofore experienced. The levers inverted may be used to replace the tire with equal facility, the grooved end being applied to the rim of the wheel.

In Fig. 4, instead of forming the hook F on the end of the lever, I provide a chain G, which is secured at one end to said lever and at its opposite end carries a hook H, which may be placed in engagement with the rim of the wheel, thus retaining the lever in its operative position with a portion of the wired edge of the casing removed from the rim.

It is apparent that a number of different constructions might be used for retaining said lever in its operative position, and I therefore do not desire to limit myself to the construction here shown and described.

Having thus described my invention, what I claim as new, and desire to secure by Letters Patent of the United States, is—

1. A tool for extracting the wired retaining edges of the outer casings of pneumatic tires from wheel-rims, comprising a lever having an engaging portion adapted to be placed in engagement with the wired edge of the casing, and a chain or cord connected at one end to said lever and carrying a hook at its opposite end adapted to be placed in engagement with a portion of the wheel for the purpose of holding said lever in its operative position, substantially as set forth.

2. The combination with the outer casing of a pneumatic tire having wired retaining edges, of a plurality of levers having engaging portions adapted to be placed successively in engagement with said wired edge and moved to disengage a portion of the latter from the wheel-rim, and a cord or chain connected to each of the levers intermediate its ends and having a hook designed to engage the rim of the wheel for retaining said levers in operative position with said wired edge removed from the rim, substantially as set forth.

HUGH SWANTON.

Witnesses:
PERCY READ SOLDRINE,
GEORGE NEWTON PRICE.